(12) United States Patent
Barnes et al.

(10) Patent No.: US 11,648,610 B2
(45) Date of Patent: May 16, 2023

(54) SYSTEM AND METHOD FOR MANUFACTURING POWDERS FROM DUCTILE MATERIALS

(71) Applicant: Metal Powder Works, LLC, Sewickley, PA (US)

(72) Inventors: John E. Barnes, Sewickley, PA (US); Christopher B. Aldridge, Austin, TX (US)

(73) Assignee: Metal Powder Works, LLC, Clinton, PA (US)

( * ) Notice: Subject to any disclaimer, the term of this patent is extended or adjusted under 35 U.S.C. 154(b) by 0 days.

(21) Appl. No.: 17/044,886

(22) PCT Filed: Apr. 4, 2019

(86) PCT No.: PCT/US2019/025790
§ 371 (c)(1),
(2) Date: Oct. 2, 2020

(87) PCT Pub. No.: WO2019/195550
PCT Pub. Date: Oct. 10, 2019

(65) Prior Publication Data
US 2021/0146442 A1    May 20, 2021

Related U.S. Application Data

(60) Provisional application No. 62/652,473, filed on Apr. 4, 2018, provisional application No. 62/652,483, filed on Apr. 4, 2018.

(51) Int. Cl.
*B22F 1/05*    (2022.01)
*B22F 9/04*    (2006.01)
(Continued)

(52) U.S. Cl.
CPC .............. *B22F 1/05* (2022.01); *B22F 1/052* (2022.01); *B22F 1/065* (2022.01); *B22F 9/04* (2013.01);
(Continued)

(58) Field of Classification Search
CPC ...... B22F 9/04; B22F 2009/046; B22F 11/00; B29B 9/06
See application file for complete search history.

(56) References Cited

U.S. PATENT DOCUMENTS 2,363,769 A * 11/1944 Zipper ...................... B22F 9/04
407/29.13
2,592,019 A *  4/1952 Farnett ............... H05K 13/0092
83/498

(Continued)

FOREIGN PATENT DOCUMENTS

EP    0457920 A1    11/1991
GB    1323571 A  *  4/1970 .............. B21F 11/00
(Continued)

*Primary Examiner* — Michael W Hotchkiss
(74) *Attorney, Agent, or Firm* — The Webb Law Firm

(57) ABSTRACT

A powder production method includes providing at least one elongated member including a ductile material; providing a rotating or vibrating cutter configured to repeatedly cut an end of the at least one elongated member to produce particles; and advancing the at least one elongated member or the cutter towards the other of the at least one elongated member or the cutter to cut the particles from the at least one elongated member to produce a powder comprising a plurality of the particles. The particles produced by the method can have a diameter ranging from about 10 μm to about 200 μm.

25 Claims, 9 Drawing Sheets

(51) Int. Cl.
*B33Y 70/00* (2020.01)
*B22F 10/20* (2021.01)
*B22F 9/08* (2006.01)
*B22F 1/052* (2022.01)
*B22F 1/065* (2022.01)
*B33Y 10/00* (2015.01)

(52) U.S. Cl.
CPC .............. *B22F 9/082* (2013.01); *B22F 10/20* (2021.01); *B33Y 70/00* (2014.12); *B22F 2009/046* (2013.01); *B22F 2304/10* (2013.01); *B22F 2998/10* (2013.01); *B33Y 10/00* (2014.12)

(56) References Cited

U.S. PATENT DOCUMENTS

| | | | | |
|---|---|---|---|---|
| 2,929,289 A * | 3/1960 | Gorecki | ................... | B21F 11/00 83/411.5 |
| 2,967,927 A * | 1/1961 | Weismann | ................ | B22F 9/04 219/121.11 |
| 3,122,038 A * | 2/1964 | Appy | ....................... | B23P 17/06 83/29 |
| 3,381,903 A * | 5/1968 | Howling | .................... | B22F 9/04 29/4.52 |
| 3,517,890 A * | 6/1970 | Priscu | ....................... | B22F 9/04 241/141 |
| 3,977,069 A * | 8/1976 | Domaingue, Jr. | ....... | D01G 1/04 156/80 |
| 4,351,484 A * | 9/1982 | Hart | .......................... | B22F 9/04 241/30 |
| 4,382,903 A | 5/1983 | Larsson et al. | | |
| 4,703,898 A * | 11/1987 | Nakagawa | .............. | B23P 17/06 241/30 |
| 5,068,066 A * | 11/1991 | Muller | ................... | B30B 11/227 264/3.3 |
| 5,071,067 A | 12/1991 | Larsson | | |
| 5,761,779 A * | 6/1998 | Maruyama | ............. | B23D 23/00 228/56.3 |
| 6,290,154 B1 * | 9/2001 | Yoshida | .................... | B26D 7/00 241/242 |
| 6,632,394 B2 | 10/2003 | Tornberg | | |
| 6,706,324 B2 | 3/2004 | Chandrasekar et al. | | |
| 6,799,711 B2 * | 10/2004 | Kurata | .................... | B22F 1/065 228/56.3 |
| 6,986,945 B2 * | 1/2006 | Mushiake | ............... | B29C 48/34 428/407 |
| 7,524,178 B2 * | 4/2009 | Rosse | ..................... | B29B 9/065 425/313 |
| 7,628,099 B2 * | 12/2009 | Mann | ........................ | B22F 9/04 82/904 |
| 7,895,872 B2 | 3/2011 | Mann et al. | | |
| 8,607,607 B1 * | 12/2013 | Sanderson | .............. | B30B 15/30 140/140 |
| 9,844,894 B2 * | 12/2017 | Schlief | .................. | B02C 18/148 |
| 2004/0253136 A1 * | 12/2004 | Shamblen | ................ | C22C 1/0416 419/34 |
| 2007/0169325 A1 | 7/2007 | Jancso | | |
| 2018/0050431 A1 | 2/2018 | Kitakaze | | |

FOREIGN PATENT DOCUMENTS

| | | |
|---|---|---|
| JP | H09184002 A | 7/1997 |
| JP | 2001137738 A | 5/2001 |
| KR | 0142075 B1 | 2/1993 |
| RU | 2203773 C2 | 5/2003 |
| WO | 8905197 A1 | 6/1989 |

* cited by examiner

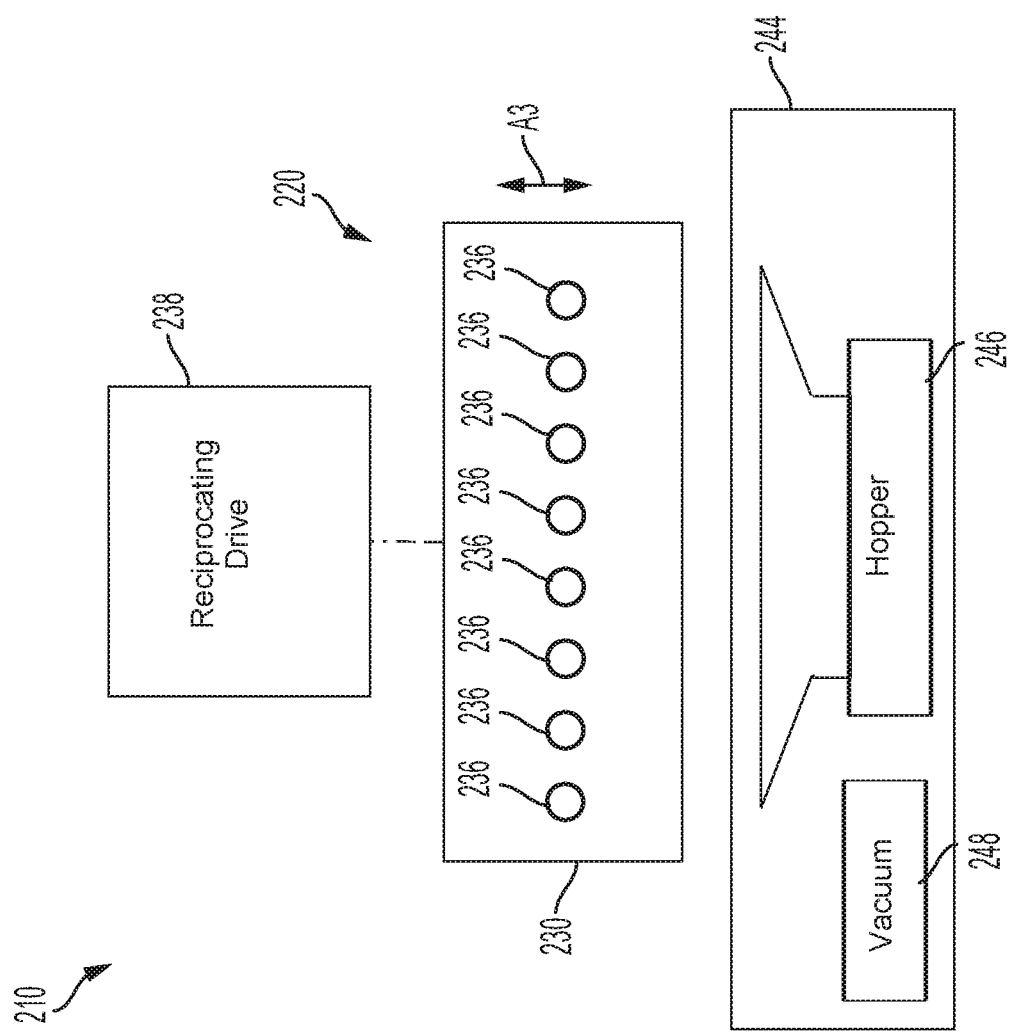

Powder Producing Machine

*Enter Target Particle Size*

| | Size (μm) | | % |
|---|---|---|---|
| Particle 1 | 20 | | 25 |
| Particle 2 | 40 | | 50 |
| Particle 3 | 80 | | 25 |

*Enter Powder Information*

Total Volume (cm³): 10.0
Total Mass (g): 270.0

*Enter Source Material Information*

Diameter (μm): 1

Material: Aluminum | Stainless Steel | Nickel Alloy | Titanium

Powder Producing Machine

*Cumulative Statistics*

Average Particle Volume (μm³): 33510
Average Particle Diameter (μm): 40
Sphericity: 0.986

*Program / Powder Statistics*

Total Volume (cm³): 25
Total Mass (g): 167

*Time Remaining*

05 min 28 sec

*Percent Complete*

SYSTEM AND METHOD FOR MANUFACTURING POWDERS FROM DUCTILE MATERIALS

CROSS REFERENCE TO RELATED APPLICATIONS

This application is the United States national phase of International Application No. PCT/US2019/025790, filed Apr. 4, 2018, and claims priority to U.S. Provisional Patent Application No. 62/652,473, filed on Apr. 4, 2018, and to U.S. Provisional Patent Application No. 62/652,483, filed on Apr. 4, 2018, the disclosures of which are hereby incorporated by reference in their entirety.

BACKGROUND OF THE INVENTION

Field of the Invention

This disclosure is directed to systems and methods for powder manufacturing and, in particular, for systems and methods for manufacturing a powder including particles with a narrow size distribution using a device that cuts extruded, drawn, or ductile members to form particles.

Description of Related Art

Additive manufacturing processes, such as 3D printing or rapid prototyping, are gaining wide acceptance as a preferred way for producing designed parts quickly and with a high degree of precision. 3D printing machines are commercially available from a number of manufacturers including EOS Electro Optical Systems Group, SLM Solutions Group AG, Concept Laser GmbH, Arcam AB, Renishaw Plc, 3D Systems, Inc., ExOne Company LLP, Hewlett-Packard Co., and General Electric (GE Additive). Such additive manufacturing and 3D printing machines transform powders, usually metal powders, into manufactured parts, such as tools, dies, machines, automotive parts, decorative articles, and similar objects. The metal powders can comprise, for example, stainless steel, low-alloy steels, nickel alloys, titanium, and similar materials. In view of the widespread use of additive manufacturing processes, it is expected that the need for source material, such as metal powders, will continue to increase.

Powders for additive manufacturing are conventionally made by atomization techniques, such as by plasma atomization or gas atomization. Atomization generally produces a powder comprising particles with a wide range of sizes. In some cases, only about 20% to 40% of powder produced by such atomization processes are usable (e.g., a proper size and shape) for additive manufacturing. The remaining 60% to 80% of the powder is used for other applications, recycled, or discarded.

An exemplary atomization device for producing metal powder is disclosed in U.S. Pat. No. 6,632,394, which is incorporated by reference herein in its entirety. The atomization device includes a metallurgical vessel for holding a quantity of molten metal. The molten metal is introduced into an atomization chamber in the form of a metal stream, which passes into the atomization chamber through a nozzle element. In the atomization chamber, gas jets of different orientations come into contact with the molten metal stream, which breaks down the molten metal stream to form droplets that freeze into grains, thereby producing metal particles.

The '394 patent discloses that the atomization method produces a powder including particles ranging in size from 0 μm to 500 μm. About 75% of the formed particles were less than 100 μm in size. 34.9% of the produced powder was between 0 and 45 μm in size. Other exemplary atomization methods for forming powders having similar yields or particle size distributions are disclosed in U.S. Pat. No. 4,382,903 and International Patent Appl. Pub. No. 89/05197.

While particles as large as 150 μm can be used with some additive manufacturing machines, generally, additive manufacturing processes are performed using particles ranging in size from about 15 μm to about 100 μm. Often large portions of powder produced by atomization methods must be used for other applications, since the particles are too large or non-uniform and not suitable for additive manufacturing. Further, efficiency and speed of 3D printing machines can be affected by a flow rate of the powder particles into and through the machine. Powders including particles of substantially uniform size and shape generally have better flow characteristics and flow through the machines more easily. Accordingly, powder manufacturing processes for efficiently producing powders of uniform size and shape will improve operating efficiency of 3D printing machines.

SUMMARY OF THE INVENTION

In view of the inconsistent particle size distributions and lack of particle uniformity provided by current powder production methods, there is a need for devices and methods for producing powders with a narrow powder size distribution (PSD) and particle uniformity. Desirably, a large majority of produced particles should be suitable to use in additive manufacturing processes. There is also a need for methods for producing dense particles with low porosity and uniform shapes to improve operating efficiency of 3D printing machines. The devices and methods disclosed herein are designed to address such needs.

According to an aspect of the disclosure, a powder production method includes: providing at least one elongated member comprising a ductile material; providing a rotating or vibrating cutter configured to repeatedly cut an end of the at least one elongated member to produce particles; and advancing one of the at least one elongated member or the cutter towards the other of the at least one elongated member or the cutter to cut the particles from the at least one elongated member to produce a powder. The powder includes a plurality of the particles having a diameter or maximum dimension ranging from about 10 μm to about 200 μm.

According to another aspect, a system for producing powders comprising a plurality of particles includes: at least one rotating or vibrating cutter configured to cut an end of at least one elongated member including a ductile material to produce particles. The cutter includes a driver for vibrating or rotating the cutter at a predetermined frequency. The system further includes at least one support for holding the at least one elongated member in a desired position relative to the at least one cutter and at least one linear actuator configured to advance the at least one elongated member towards the at least one cutter. The system further includes at least one controller electrically connected to the at least one driver and to the at least one linear actuator. The controller includes an input component and is configured to cause the linear actuator to move the at least one elongated member towards the cutter at a predetermined feed rate and to cause the cutter to vibrate or rotate at the predetermined frequency.

Examples of the present invention will now be described in the following numbered clauses:

Clause 1: A powder production method comprising: providing at least one elongated member comprising a ductile material; providing a rotating or vibrating cutter configured to repeatedly cut an end of the at least one elongated member to produce particles; and advancing one of the at least one elongated member or the cutter towards the other of the at least one elongated member or the cutter to cut the particles from the at least one elongated member to produce a powder comprising a plurality of the particles having a diameter or maximum dimension ranging from about 10 μm to about 200 μm.

Clause 2: The method of clause 1, wherein cutting the at least one elongated member comprises advancing the at least one elongated member towards the cutter at a predetermined at least one feed rate, and moving the cutter to cut the plurality of particles from the at least one elongated member at a predetermined at least one vibrational or rotational frequency.

Clause 3: The method of clause 1 or clause 2, wherein the cutter comprises a rotating disc comprising at least one aperture sized to receive the at least one elongated member.

Clause 4: The method of any of clauses 1-3, comprising providing a plurality of elongated members and simultaneously cutting particles from each of the plurality of elongated members with the cutter.

Clause 5: The method of any of clauses 1-4, wherein the at least one elongated member comprises a drawn metal wire having a circular cross section.

Clause 6: The method of any of clauses 1-5, wherein the at least one elongated member comprises one or more of steel, nickel, aluminum, or titanium.

Clause 7: The method of any of clauses 1-6, wherein the at least one elongated member has a diameter or maximum dimension of 10 μM or greater.

Clause 8: The method of any of clauses 1-7, wherein the at least one elongated member has a diameter or maximum dimension ranging from 10 μm to 200 μm.

Clause 9: The method of any of clauses 1-8, wherein at least 95% of the particles of the plurality of particles have a diameter within 10% of a target size.

Clause 10: The method of clause 9, wherein the target size comprises a diameter of from 10 μm to 200 μm.

Clause 11: The method of any of clauses 1-10, wherein at least 95% of the particles of the plurality of particles have a diameter ranging from 15 μm to 100 μm.

Clause 12: The method of any of clauses 1-11, wherein at least 99% of the particles of the plurality of particles have a diameter ranging from 15 μm to 100 μm Clause 13: The method of any of clauses 1-12, wherein advancing the at least one elongated member towards the at least one cutter comprises advancing the at least one elongated member at a first feed rate for a first predetermined time period followed by advancing the at least one elongated member at a second feed rate for a second predetermined time period.

Clause 14: The method of clause 13, wherein during the first predetermined time period, a first plurality of the particles is produced, wherein at least 95% of the particles of the first plurality of particles have a diameter within 10% of a first target size.

Clause 15: The method of clause 14, wherein during the second predetermined time period, a second plurality of the particles is produced, wherein at least 95% of the particles of the second plurality of particles have a diameter within 10% of a second target size, which is different that the first target size.

Clause 16: The method of clause 15, further comprising selecting a target particle size distribution for the first target size and the second target size and, prior to advancing the at least one elongated member towards the cutter, determining the first time period and the second time period based on the selected particle size distribution.

Clause 17: The method of any of clauses 1-16, wherein cutting the particles from the at least one elongated member to produce the powder does not introduce porosity to the particles, such that a porosity of the particles is substantially the same as a porosity of the elongated member.

Clause 18: The method of any of clauses 1-17, further comprising, after the powder is produced, spheroidizing the plurality of particles by applying at least one of heat, a chemical agent, and abrasive forces to the particles.

Clause 19: A system for producing powders comprising a plurality of particles, the system comprising: at least one rotating or vibrating cutter configured to cut an end of at least one elongated member comprising a ductile material to produce particles, the cutter comprising a driver for vibrating or rotating the cutter at a predetermined frequency; at least one support for holding the at least one elongated member in a desired position relative to the at least one cutter; at least one linear actuator configured to advance the at least one elongated member towards the at least one cutter; and at least one controller electrically connected to the at least one driver and to the at least one linear actuator, the controller comprising an input component and being configured to cause the linear actuator to move the at least one elongated member towards the cutter at a predetermined feed rate and to cause the cutter to vibrate or rotate at the predetermined frequency.

Clause 20: The system of clause 19, wherein the predetermined feed rate and the predetermined frequency are received by the controller with the input component.

Clause 21: The system of clause 19 or clause 20, further comprising a collection vessel configured to receive the plurality of particles formed by cutting the at least one elongated member.

Clause 22: The system of clause 21, wherein the collection vessel comprises a vacuum configured to draw a powder into the collection vessel.

Clause 23: The system of clause 21 or clause 22, wherein the collection vessel comprises one or more sensors electrically connected to the at least one controller, the one or more sensors being configured to measure characteristics of the produced powder, and wherein the at least one controller is configured to modify the one or more operating parameters of the at least one driver based on information detected by the one or more sensors.

Clause 24: The system of clause 23, wherein the one or more sensors are configured to detect at least one of: average particle volume, median particle volume, particle volume distribution, total powder weight, total powder volume, or average sphericity.

Clause 25: The system of any of clauses 19-24, wherein the at least one controller is configured to receive by the input component a target particle size and to automatically adjust at least one of the feed rate and the predetermined frequency to produce particles of the selected size.

Clause 26: The system of clause 25, wherein the selected target particle size can be adjusted dynamically by a user while the driver is in operation.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. As used in the specification and the claims, the singular form of "a", "an", and "the" include plural referents unless the context clearly dictates otherwise.

BRIEF DESCRIPTION OF THE DRAWINGS

FIG. 213 is a schematic drawing of another example of a cutting die for a particle device, according to an aspect of the disclosure;

FIG. 4B is schematic drawing of a front view of the device of FIG. 4A;

FIGS. 6A-6C show screens of a user interface for controlling and receiving feedback from a powder manufacturing system including the device of FIG. 1A, according to aspects of the present disclosure.

DETAILED DESCRIPTION OF THE PRESENT INVENTION

Figure 1A:
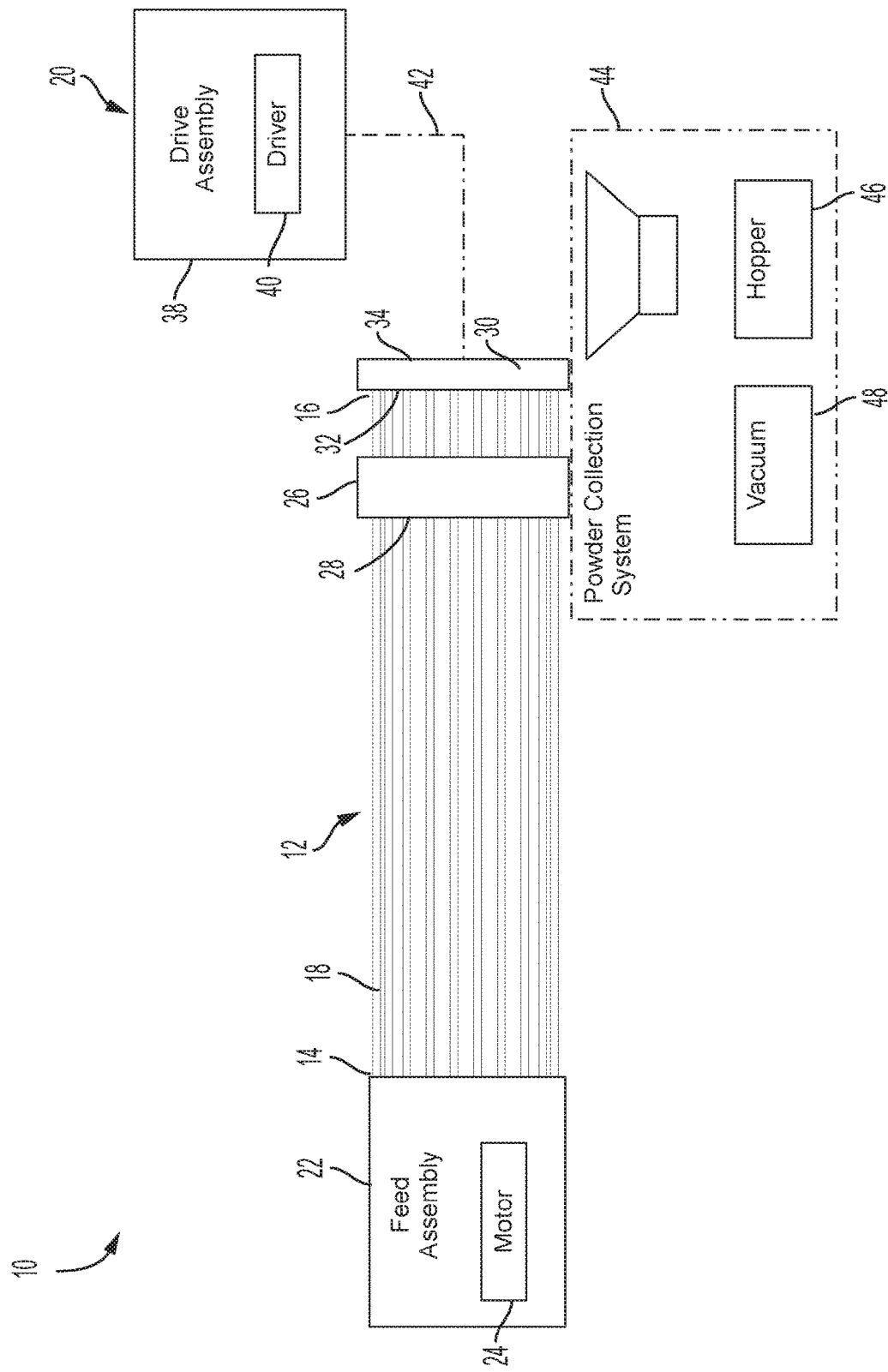
FIG. 1A is schematic drawing showing a side view of a particle cutting device, according to an aspect of the disclosure.

For purposes of the following detailed description, it is to be understood that the invention may assume various alternative variations and step sequences, except where expressly specified to the contrary. Moreover, other than where otherwise indicated, all numbers expressing, for example, a size, diameter, or maximum dimension of a particle, as used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

As used herein, the singular form of "a", "an", and "the" include plural referents unless the context clearly dictates otherwise.

As used herein, the terms "top", "bottom", and derivatives thereof shall relate to the invention as it is oriented in the drawing figures. The term "proximal" refers to a portion of an object held by or mounted to another structure. The term "distal" refers to a portion of an object opposite from the "proximal" end thereof and, for example, can be a free portion or end of the object that is not held by or mounted to another structure. However, it is to be understood that the invention can assume various alternative orientations and, accordingly, such terms are not to be considered as limiting. Also, it is to be understood that the invention can assume various alternative variations and stage sequences, except where expressly specified to the contrary. It is also to be understood that the specific devices and processes illustrated in the attached drawings, and described in the following specification, are examples. Hence, specific dimensions and other physical characteristics related to the embodiments disclosed herein are not to be considered as limiting.

The present disclosure is directed to shearing and/or cutting devices 10, as well as to methods, and control systems 100 for such devices 10. The cutting devices 10, methods, and control systems 100 are configured to produce powders by cutting particles of a desired size from extruded or drawn members, such as wires, cables, filaments, or strands, formed from ductile materials. The extruded or drawn members can comprise particles formed from ductile materials, such as metals and selected polymers, which are capable of being extruded or drawn. The produced particles can be suitable for additive manufacturing processes, such as for use with 3D printing and rapid prototyping machines. Desirably, the cutting device 10 provides greater control over particle size, morphology aspect ratio, density, porosity, and other characteristics than can be provided by other manufacturing processes. Increased control over particle size and shape is believed to be especially useful for additive manufacturing processes, such as manufacturing processes performed with 3D printing and rapid prototyping machines. As discussed previously, such additive manufacturing processes generally require substantial quantities of powders with similarly sized particles having substantially uniform shapes.

In some examples, the cutting device 10 can produce a powder with a narrow or tightly controlled powder size distribution (PSD). For example, produced powders can comprise a plurality of particles, wherein at least about 95% of the particles have a diameter or maximum dimension of less than 200 µm, and, preferably, at least 95% of the particles have a diameter or maximum dimension ranging in size from about 10 µm to about 200 µm. Theoretically, the cutting device 10 could produce a powder in which at least 99% of the particles have a diameter or maximum dimension ranging from 15 µm to 100 µm. As used herein, "maximum dimension" refers to a longest straight-line distance between points on opposite sides of a particle along an axis of the particle and passing through a center of the particle. For example, for a spherical particle, the maximum dimension and diameter are the same. For cylindrical, ellipsoid, or rectangular shaped particles, the maximum dimension would be an axial length of the particle.

In some examples, at least 95% of particles of the powder can have a diameter or maximum dimension within 10% of the target size. Theoretically, the methods disclosed herein could provide a powder in which 95% of the particles have a diameter or maximum dimension within 1% of the target size. The target size can be, for example, an optimal target size for 3D printing. While not intending to be bound by theory, it is believed that an optimal size for 3D printing may be from about 15 μm to 100 μm, depending on the material and printing machine being used. For example, the cutting device 10 can be used to produce a powder in which 95% of the particles have a diameter or maximum dimension of 45 μm±10%. The cutting device 10 can also be used to produce powders including two or more target particle sizes. For example, a powder could be prepared in which 50% of the particles fall within a first narrow size range and 50% of the particles are within a second narrow size range different and separate from the first size range. For example, a powder could be produced in which 50% of the particles have a diameter or maximum dimension of 20 μm±10% and 50% of the particles have a diameter or maximum dimension of 80 μm±10%. The cutting device 10 can produce the powder with the selected particle size or sizes. The user can change the desired particle size or shape easily merely by entering a new particle size into the system.

While not intending to be bound by theory, it is believed that particle shape or morphology is related to particle flow rate in additive manufacturing processes. In particular, it is believed that particles of certain uniform shapes flow more readily through 3D printing machines than do powders including particles having different or non-uniform shapes. The cutting device 10 provides a mechanism for controlling particle morphology with a high degree of sensitivity. Accordingly, the cutting device 10 can be used for producing particles optimized for increased flow rate in additive manufacturing processes.

Further, the cutting device 10 can produce particles having a variety of morphologies and aspect ratios without introducing porosity. If the morphology of the formed particles is not satisfactory, the particles produced by the methods disclosed herein can be made to better conform to a desired shape (e.g., to become more spherical) by post-processing techniques. Further, particles produced by the methods disclosed herein generally have low porosity relative to particles produced by other methods. As used herein, "low porosity materials" are materials having an inner mass or bulk portion that is substantially free from pores, cavities, void spaces, openings, or crevices. In particular, since formation of particles by the cutting device 10 does not introduce porosity, particles formed by the cutting device 10 and methods disclosed herein have substantially the same porosity as the source material or elongated members 12. Particles formed by the cutting device 10 are also denser than particles formed by atomization methods. In some cases, using denser particles for additive manufacturing can reduce or eliminate a need for post-processing of molded or printed articles to remove porosity. For example, molded articles made using the powders disclosed herein may not need to be processed by hot isostatic pressing, as is currently performed during additive manufacturing.

While not intending to be bound by theory, it is also believed that the devices 10 and methods disclosed herein produce powder particles having certain chemical advantages compared to particles formed by atomization. For example, the devices 10 and methods disclosed herein do not alter a phase composition of the source material or feedstock during formation of the powder. Accordingly, the devices 10 and methods disclosed herein can be used for forming powders from non-weldable materials, without additional processing steps required by atomization. Non-weldable materials can include high melting temperature metal alloys (e.g., 7000 Series Aluminum alloy) and engineered polymers with high melting temperatures. High melting temperature materials can be non-weldable because precipitates formed from such materials tend to re-dissolve into solution during heating or welding. In that case, the solution would need to be allowed to age to allow the precipitates to fall back out of solution. In a similar manner, atomization of high melting point materials also causes precipitates to dissolve into solution. In order to reform the precipitates, some atomization processes re-melt the solution while others avoid melting the solution entirely (e.g., for binder jet and cold spray processes). In contrast, in one specific example, irregular shaped powders formed from a non-weldable alloy (e.g., 7000-series Aluminum) could be printed by a cold spray process. Beneficially, the phase composition of the powder particles is retained during the formation process. Phase composition would also be preserved during binder jetting, which is also a cold process.

Rotating or Vibrating Particle Cutter Devices

Figure 1B:
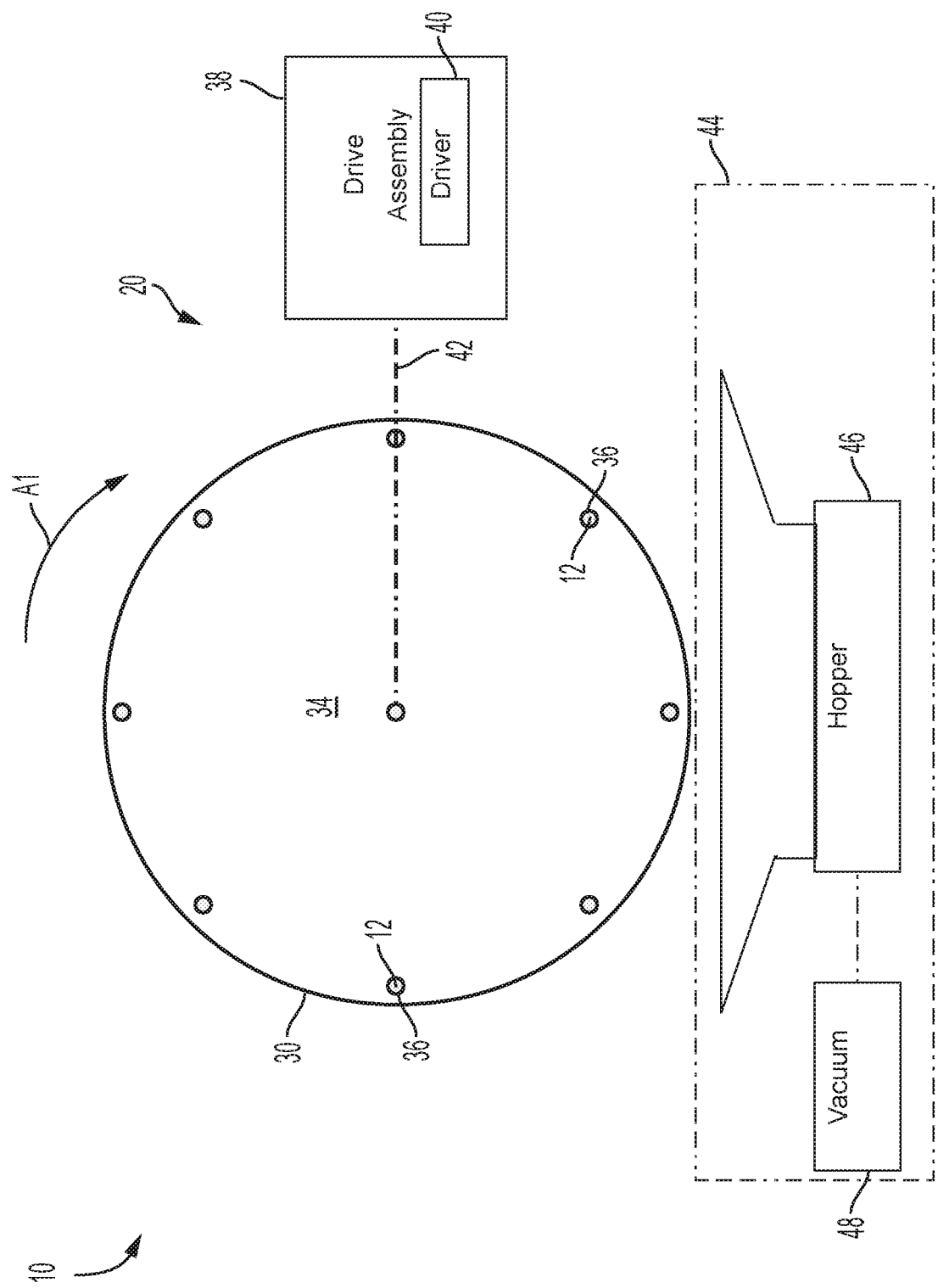
FIG. 1B is schematic drawing of a front view of the device of FIG. 1A.

FIGS. 1A and 1B show a cutting device 10, which produces particles by shearing and/or cutting particles of a desired size from ends of extruded or drawn elongated members 12 extending through the cutting device 10. The cutting device 10, shown in FIGS. 1A and 1B, includes eight elongated members, though the number of elongated members is not intended to be limiting. In other examples, the cutting device 10 could be adapted to include additional elongated members to increase production speed and efficiency. For example, a cutting device 10 could include twelve or more elongated members 12. The cutting device 10 is configured to produce particles of a substantially uniform predetermined size or PSD from the elongated members 12 with a high degree of precision and controllability. The elongated members 12 are generally drawn articles (e.g., wires, cables, filaments, rods, rods, or strands) comprising a first or proximal end 14, a second or distal end 16 configured to be cut by a cutter assembly 20, and an elongated body 18 extending between the proximal end 14 and the distal end 16.

The elongated members 12 can be formed from ductile materials. As used herein, a "ductile material" refers to a material that is capable of being extruded or drawn into a thin wire or strand. For example, in order to produce particles of an appropriate size for additive manufacturing processes, the ductile materials referred to herein may need to be capable of being drawn into a thin wire having a diameter as small as 10 μm. In some examples, a diameter of the elongated members 12 can range from 10 μm to 200 μm or, preferably, from 15 μm to 100 μm. The ductile material is generally of high or premium quality, and can be virgin material of known composition and without contaminants. In some examples, the material can comprise a recycled material. The material can be a metal material, such as steel, nickel, aluminum, titanium, platinum, rhenium, niobium, and alloys thereof. The material could be a high performance or high melting point alloy, such as 7000-series Aluminum. In other examples, the elongated members 12 can comprise polymers, which are capable of being extruded or drawn. In some examples, materials that have precipitate reinforced strengtheners, which would be affected by atomizing, can be used with the devices 10 and methods disclosed herein without posing a challenge.

The cutting device 10 can further comprise a mechanical feed assembly 22 configured to advance the elongated members 12 towards the cutter assembly 20. In some examples, the feed assembly 22 comprises a motor 24 configured to release or payout the elongated members 12. For example, the motor 24 could be mechanically coupled to one or more rotatable spindles (not shown), which receive the elongated members 12. For example, elongated members 12 can be provided on spools configured to be coupled to the spindles. The motor 24 could be configured to rotate the spindles to payout the elongated members 12 in a coordinated manner for even cutting and controllable particle size. In some examples, the feed assembly 22 can comprise multiple and/or distributed feed motors 24 configured to independently payout or release the elongated members 12. For example, each spindle could be coupled to and driven by a different motor 24. In that case, the spindles can be configured to rotate independently, providing enhanced control over the movement of each elongated member 12.

In some examples, the cutting device 10 further comprises a support 26 for holding the elongated members 12 in a desired position relative to the cutter assembly 20. As shown in FIG. 1A, the support 26 can be positioned between the feed assembly 22 and the cutter assembly 20, The support 26 can be a circular die including a plurality of holes, openings, gaps, spaces, or apertures 28, each of which is configured to receive one of the elongated members 12, The apertures 28 are desirably at least slightly larger than the cross-section of the elongated members 12 so that the elongated members 12 can pass easily through the apertures 28 towards the cutter assembly 20.

The cutter assembly 20 generally comprises a rotating or vibrating cutter 30 and associated mechanical or vibrating components for causing the cutter 30 to rotate or vibrate at a selected frequency. The cutter 30 can be configured to cut the distal ends 16 of the elongated members 12 to produce the particles. The cutter 30 can be a disc shaped structure including a flat proximal surface or side 32 and an opposing flat distal surface or side 34. The cutter 30 includes a plurality of holes, openings, gaps, spaces, or apertures 36 extending through the cutter 30 between the proximal surface or side 32 and the distal surface or side 34 thereof. As shown in FIG. 1B, the apertures 36 can be circular openings configured to receive the distal ends 16 of the elongated members 12. In other examples, apertures 36 can be other shapes, such as squares, diamonds, triangles, or ellipses.

The cutter 30 is configured to rotate or vibrate, such that portions of the apertures 36 contact the distal ends 16 of the elongated members 12. Shear forces from the contact desirably cause the particles to break off of the distal ends 16 of the elongated members 12. In order to impart sufficient movement to the cutter 30 to generate particles, the cutter 30 can be mechanically coupled to a rotational or vibrational drive or drive assembly 38, For a rotating cutter 30, the drive assembly 38 can comprise a rotating or reciprocating motor or drive device (referred to herein as a drive 40) mechanically coupled to and configured to rotate a shaft 42, The shaft 42 can be mounted to, for example, the distal side 34 of the cutter 30 to rotate the cutter 30 in a selected direction. For example, the drive 40 can cause the cutter 30 to rotate in full rotations, such as full 360° rotations in a direction of arrow A1 (shown in FIG. 1B). In other examples, the drive 40 could cause the cutter 30 to oscillate back and forth to produce the particles from the elongated members 12.

For a cutting device 10 that applies vibrational forces rather than rotational forces to cutter 30 to form the particles, the drive assembly 38 can comprise a vibrating device, such as a resonant structure, configured to vibrate at selected frequencies. The vibration frequency can be an ultrasonic vibration frequency. For example, the resonant structure can comprise a tuned sonotrode that is excited to resonance.

Figure 2A:
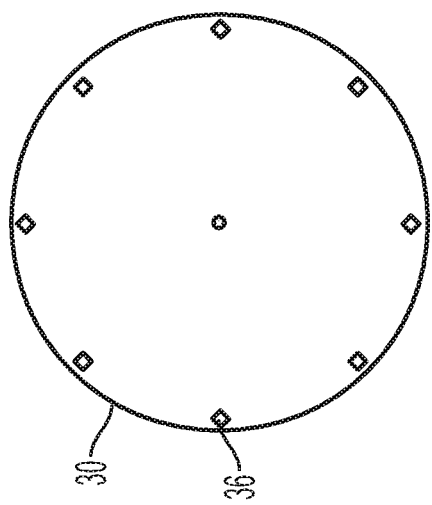
FIG. 2A is a schematic drawing of another example of a cutting die for a particle device, according to an aspect of the disclosure.
Figure 2B:
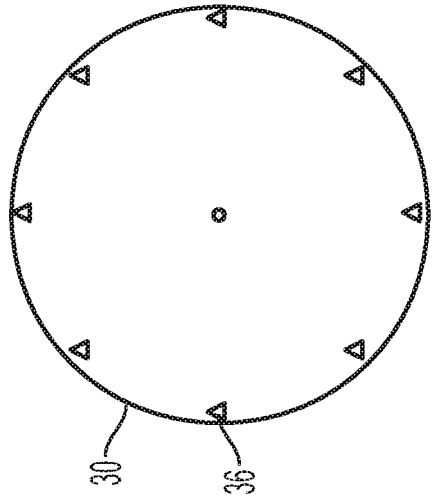
FIG. 2C is a schematic drawing of another example of a cutting die for a particle device, according to an aspect of the disclosure.
Figure 2C:
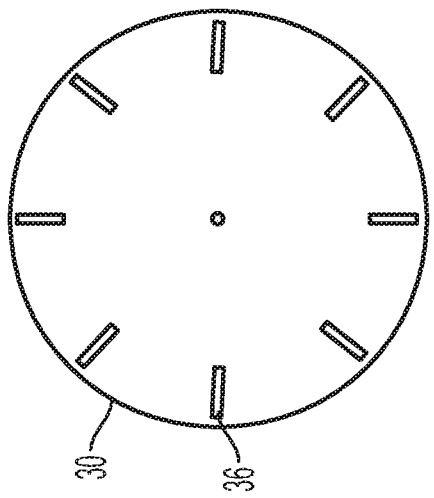

As shown in FIG. 1B, the apertures 36 extending through the cutter 30 are circular. Further, the apertures 36 are approximately equidistantly positioned about a periphery of the sides 32, 34 of the cutter 30. As shown in FIG. 1B, the cutter 30 can include eight apertures 36, each of which is configured to receive one of the elongated members 12. However, the number of elongated members 12 and apertures 36 is not intended to be limiting. Instead, some devices 10 can include twelve or more apertures 36 configured to receive twelve separate elongated members 12. In other examples, the cutting device 10 could include only a single elongated member 12 and aperture 36. FIGS. 2A-2C show cutters 30 including different shapes of apertures 36. For example, in the cutter 30 shown in FIG. 3A, the apertures 36 are triangular. In the cutter 30 of FIG. 213, the apertures 36 are diamond shaped. The cutter 30 in FIG. 2C includes elongated slots, each of which extends along a radius of the cutter 30. It is believed that the different shaped apertures 36 will impart different morphologies to produced particles. Particles with different morphologies can be adapted to be used with different types of additive manufacturing and printing machines. For example, currently, spherical particles are desired for most applications. However, particles that are disc shaped, platelets, or have flat surfaces may be desirable for some applications. If greater control over particle morphology is required, as described herein, particles can be post-processed to, for example, impart increased sphericity to the particles.

With reference again to FIGS. 1A and 1B, the cutting device 10 can further comprise a powder collection system 44. The powder collection system 44 can comprise a collection vessel or hopper 46 for receiving the particles formed by contact between the elongated members 12 and the cutter 30. In some instances, the collection vessel or hopper 46 can be gravity fed, meaning that the particles formed from the elongated members 12 fall into the hopper 46 by gravity. In other examples, the powder collection system 44 can comprise a vacuum or negative pressure source that draws the particles into the collection vessel or hopper 46. For example, a suction or vacuum pump 48 could be provided to draw particles away from the elongated members 12 and into the hopper 46. Suction can also be used for emptying the hopper 46 once a sufficient amount of powder has been produced. For example, suction could be used to draw particles out of the hopper 46 and into another storage container through a drain or outlet port.

Powder Production Method

Figure 3:
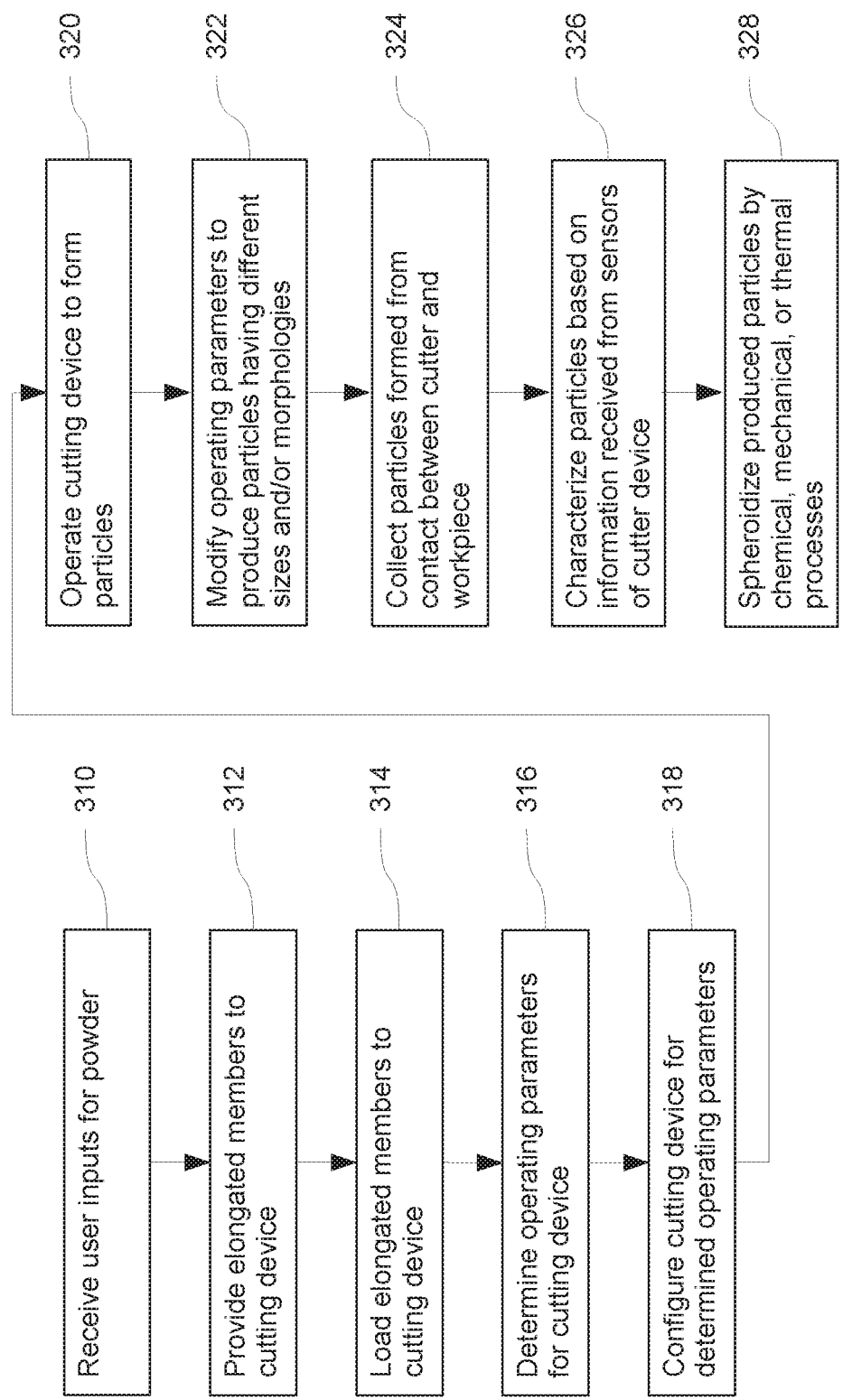
FIG. 3 is a flow chart showing steps of a method for producing particles using a particle cutting device according to an aspect of the disclosure.

Having described the reciprocating or rotating cutting device 10 and the elongated members 12, a method for producing a powder using the cutting device 10 will now be described in detail. A flow chart of steps for performing the method of producing the powder is shown FIG. 3. In some instances, many of the steps of the method of FIG. 3 are performed automatically by an automated control system associated with the cutting device 10. In particular, many of the steps for selecting and adjusting operating parameters of the cutting device 10 can be performed automatically. In some instances, a user may provide an instruction to the controller or control system about a powder to be formed. For example, the user may manually enter a target size, size distribution, or PSD for the powder to be formed. The user could also enter a total volume or mass of powder to be produced. In that case, the controller or control system can be configured to calculate operating parameters or a program for producing the powder with the selected characteristics and issue operating instructions to the cutting device 10 to perform the program. Once the specified amount of powder is produced and the program is completed, the controller or control system can be configured to turn off the feed assembly 22 and, in some instances, provide a notification to a user that production of the powder has been completed.

In other examples, some aspects of the method can be performed or controlled manually. For example, the user can manually enter operating parameters for the cutting device 10, turn on the cutting device 10 to begin producing the powder, and, when a sufficient amount of powder has been produced, manually turn off the cutting device 10.

The powder production method can initially include, at step 310, receiving or determining inputs for the powder to be produced. As discussed previously, the inputs could include a target particle size or powder size distribution (PSD). The inputs could also include information about the elongated members, such as the type of material, density of the material, diameter of the elongated member, or any other characteristics needed to control operation of the cutting device 10, The inputs could also include information about how much (e.g., a total mass or volume) powder should be produced.

At step 312, the elongated members 12 are provided to the cutting device 10. For example, elongated members 12 could be provided on spools or similar retention members. The spools could be mounted to corresponding spindles of the feed assembly 22 so that the feed assembly 22 can payout the elongated members 12 as the cutting device 10 is in use. At step 314, the elongated members 12 can be fed through the cutting device 10. For example, the ends 16 of the elongated members 12 can be fed through the support 26 or die and through the apertures 36 of the rotating or vibrating cutter 30.

At step 316, the method further comprises determining operating parameters for the cutting device 10 based on the inputs for the powder to be produced (e.g., particle size and total volume or mass of the powder) and, for example, characteristics of the elongated members 12. The operating parameters of the cutting device 10 can include, for example, a feed rate or payout rate of the feed assembly 22 and rotational or vibrational frequency of the cutter 30. In some examples, the operating parameters can be obtained from a look-up table or calculated from a calibration curve or calibration equation, which provides optimized operating parameters for the cutting device 10 for a given particle size (e.g., diameter or maximum dimension) and type (e.g., size and material composition) of elongated member 12. Values in the lookup table and/or the calibration curve can be experimentally determined. Alternatively, such values can be mathematically derived using, for example, computer modeling software for modeling interactions between the elongated members 12 and the cutter 30.

In some examples, step 316 can further comprise determining multiple operating parameters to produce particles of different sizes and/or having different morphologies. A powder could be produced to have a unique and controlled powder size distribution. For example, a powder could be produced in which 50% of the particles are within 10% of a first target size and 50% of the particles are within 10% of a second target particle size. In order to produce such unique powder size distributions, step 316 can comprise determining operating parameters for a first period of time to produce particles of the first target size and determining operating parameters for a second period of time to produce particles of the second target size. Step 316 can further comprise determining a duration of the first period of time and the second period of time required to produce the selected size distribution. For example, if the desired ratio of first size particles to second size particles is 50/50, the time periods may be the same. If another ratio (e.g., 20/80, 30/70, or 40/60) is required, then the first and second time periods could be different.

Once operating parameters to achieve the target particle size or distribution are determined, at step 318, the cutting device 10 can be automatically or manually configured to execute a program or instructions for producing particles according to the determined operating parameters. For example, a control system 100 for the cutting device 10 could be configured to automatically adjust the operating parameters of the cutting device 10 for the determined parameters. In other examples, the user may manually select or enter operating parameters for the cutting device 10 using an appropriate interface device.

At step 320, the method further comprises a step of operating the cutting device 10 to produce the particles. For example, operating the cutting device 10 can include advancing the elongated members 12 towards the cutter 30 and rotating or vibrating the cutter 30 to cut the particles from the at least one elongated member 12 to produce the powder. In particular, in order to produce the particles, the cutting device 10 may cause the feed assembly 22 to payout the elongated members 12 according to the configured operating parameters (e.g., according to a predetermined feed rate). The cutting device 10 can also cause the cutter 30 to rotate or vibrate at a selected rotational or vibrational frequency suitable for producing particles of a desired size or range of sizes.

At step 322, the method can further comprise changing operating parameter of the cutting device 10 during particle production to produce particles having different target sizes or morphologies. For example, as discussed previously, the method can comprise operating the cutting device 10 at the first feed rate and first rotational or vibrational frequency for the determined first period of time. After the first period of time, the method can comprise automatically or manually changing operating parameters of the cutting device 10 to produce different sized particles.

At step 324, particles produced from the contact between the cutter 30 and the elongated members 12 are collected by the powder collection system 44. For example, particles can be drawn into the collection vessel or hopper 46 by gravity and/or by suction forces from the vacuum pump 48.

At step 326, the collected particles can be characterized by sensors located in the collection vessel or hopper 46. For example, sensors can be used to detect particle size, shape, and other characteristics. In some cases, the detected characteristics can be compared to the user inputs received in step 310. If the collected particles differ from the received inputs, operating parameters of the cutting device 10 can be dynamically adjusted to account for such differences.

At step 328, in some examples, after the powder is produced, the method optionally further comprises spheroidizing the plurality of particles by applying, for example, heat and/or abrasive forces to the particles. As used herein, spheroidization refers to any of a number of chemical, thermal, or mechanical processes for affecting a shape of formed particles to more closely resemble a sphere. Spherical particles generally have a better flow rate than non-spherical particles, especially for fine particles. Fine particles generally flow poorly compared to larger particles. Making the fine particles spherical improves the flow rate. Also, while the cutting device 10 and method disclosed herein are not believed to introduce surface contaminants to the particles, spheroidizing particles would also purify the particles and/or release any contaminants, if present, from the surface of the particles.

While not intending to be bound by theory, it is believed that highly uniform spherical particles may be preferred for certain additive manufacturing processes. Particularly, spherical particles are often preferred in industry for use with currently available laser powder bed processes. Other additive manufacturing processes can be morphology insensitive or may prefer non-spherical particles. As discussed previously, cutters 30 including different shapes and arrangements of apertures 36 can be used to obtain different non-spherical particles. Also, other processing techniques could be applied to the formed particles to further control morphology of non-spherical particles.

Linear Cutter Device

Figure 4A:
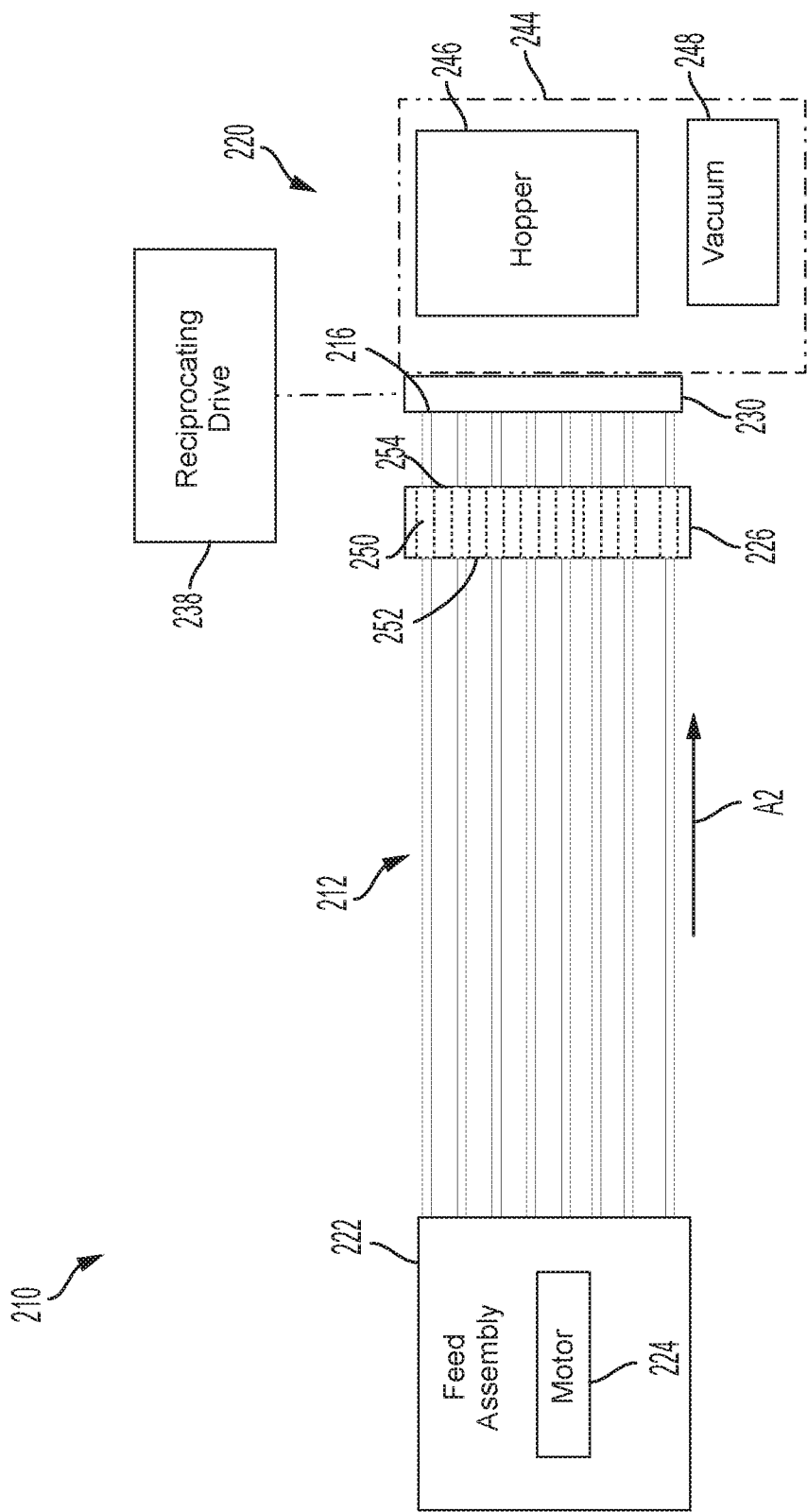
FIG. 4A is a schematic drawing showing a top view of another example of a particle cutting device, according to an aspect of the disclosure.

With reference to FIGS. 4A and 4B, another example of a cutter device 210 for producing particles from a plurality of elongated members 212 is shown. As in previous examples, the cutter device 210 comprises a feed assembly 222 for advancing the elongated members 212 towards the cutting assembly 220. As in previous examples, the cutting assembly 220 comprises the die or support 226 for receiving and supporting the elongated members 212 during cutting. As shown in FIGS. 4A and 4B, the elongated members 212 are arranged in a straight line to form a linear array, rather than in a circular pattern. In order to accommodate the linearly arranged elongated members 212, the support 226 comprises apertures 250 or through holes arranged in a line. Each aperture 250 receives one of the elongated members 212. For example, as shown in FIG. 4A, the support 226 is a rectangular shaped structure comprising a flat proximal surface or side 252 and an opposing flat distal surface or side 254. The support 226 further comprises the apertures 250 extending between the opposing flat sides 252, 254.

As discussed previously, the cutting device 210 includes the feed assembly 222. In some instances, the feed assembly 222 can be simplified compared to previously described examples. In particular, it is believed that controlling advancement or payout of elongated members 212 arranged in a line may be easier than for elongated members 12 arranged in circular patterns, as in previous examples. For example, since the linearly aligned elongated members 212 advance in the same direction (a direction shown by arrow A2 in FIG. 4A) and at the same rate, the feed assembly 222 could include only a single common feed motor 224 for advancing all of the elongated members 212. In contrast, a circular arrangement of elongated members 212 may require multiple or distributed motors so that advancement of different ones of the elongated members 212 towards the cutting assembly 220 can be independently controlled.

As shown in FIGS. 4A and 4B, the cutter device 210 replaces the circular rotating cutter 30 of previous examples with a reciprocating cutter 230. The reciprocating cutter 230 moves back and forth in a straight line, as shown by arrow A3. The cutter 230 can be a rectangular shaped structure including the apertures 236 (shown in FIG. 4B) arranged to receive the elongated members 212. The apertures 236 can be circular, elliptical, rectangular, or any other convenient shape. The apertures 236 could also comprise elongated slots. As in previous examples, a shape of the apertures 236 can impact morphology of particles produced by the cutter device 210.

The cutter assembly 210 can further comprise a drive 238 coupled to the cutter 230 to move the cutter 230 back and forth, as shown by arrow A3. The drive 238 can be configured to cause the cutter 230 to oscillate back and forth due to linear ultrasonic excitation, as opposed to the rotational motion of the cutter 230 shown in FIGS. 1A and 1B. As in previous examples, the drive mechanism can be configured to vibrate and/or oscillate the cutter 230 at a predetermined rate. The rate of movement of the cutter 230 can impact size and morphology of the produced particles. In some examples, the drive 238 comprises a resonant structure, such as a tuned sonotrode, that is excited to preselected resonance. The resonant structure can be configured to impart vibrational forces to the cutter 230, causing the cutter 230 to contact the elongated members 212 to form the particles.

More specifically, in order to generate particles using the cutting device 210, elongated members 212 are provided to the feed assembly 222. For example, spools or similar retention members of the elongated members 212 can be loaded onto rotatable spindles of the feed assembly 222. The elongated members 212 can then be fed through apertures 250 or openings in the support 226 or die and towards the cutter 230. In use, the feed assembly 222 causes portions of the elongated members 212 to protrude through the support 226 or die and to the apertures 236 of the cutter 230. The cutter 230 can be configured to oscillate or vibrate, such that the apertures 236 exert a shearing force on the distal ends 216 of the elongated members 212. The shearing force applied to the distal ends 216 of the elongated members 212 cause particles to be produced from the elongated members 212. The produced particles can be collected by the powder collection system 244, as described in previous examples. For example, particles can fall by gravity into the collection vessel or hopper 246. Alternatively or in addition, the vacuum pump 248 can be used to draw particles formed by the contact between the elongated members 212 and cutter 230 into the collection vessel or hopper 246.

Powder Production System

Figure 5:
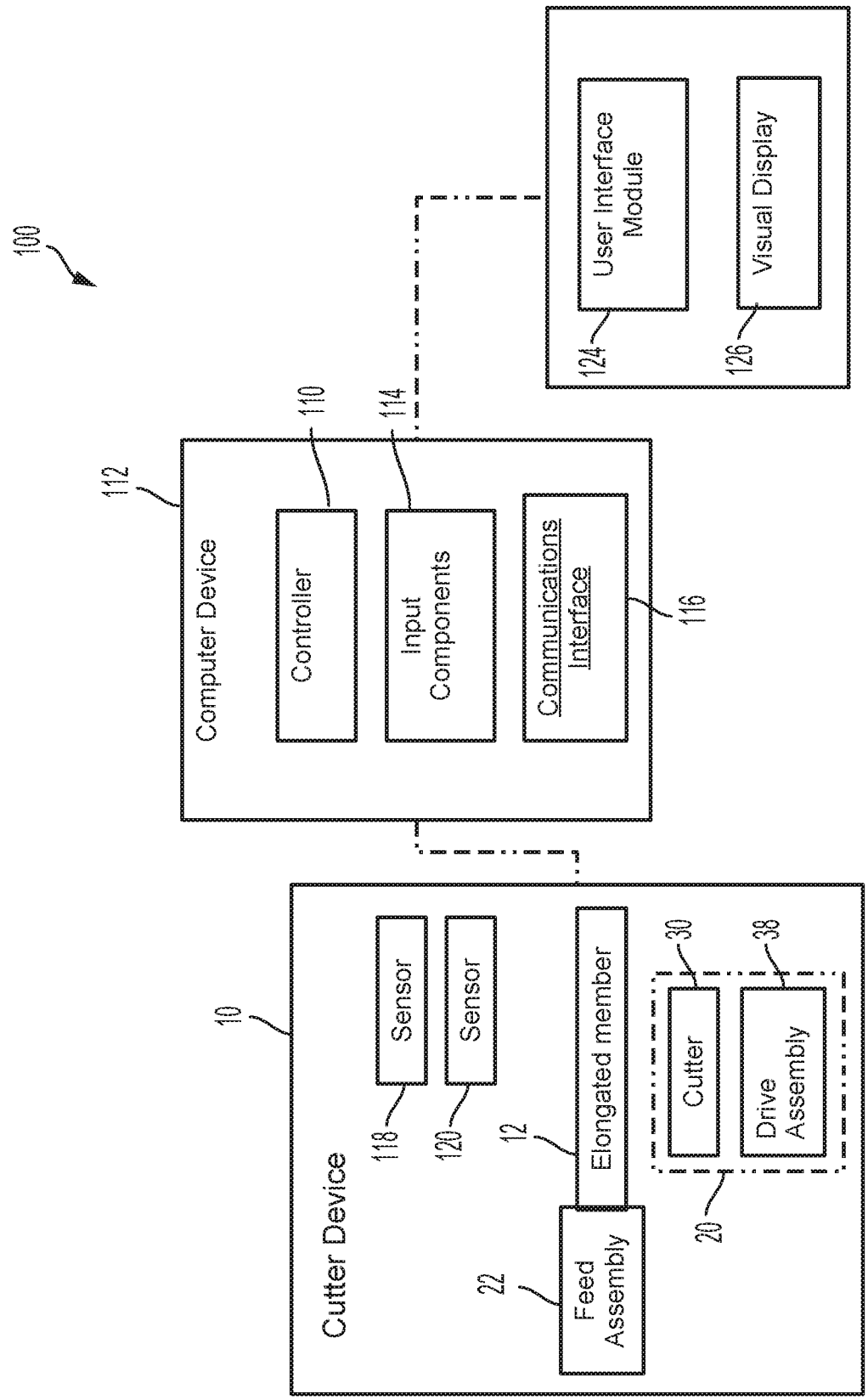
FIG. 5 is a schematic drawing of a system for generating a powder according to an aspect of the disclosure.

Having described features of the cutting devices 10, 210 and powder producing method, electrical components of a control system 100 for controlling the cutting device 10 to produce the powder will now be described in detail. A schematic drawing of the system 100 is shown in FIG. 5. The system 100 comprises a cutting device 10 including the elongated members 12 configured to be contacted by the cutter 30 to produce particles. The system 100 further comprises a controller 110 electrically coupled to electromechanical components of the cutting device 10, For example, the controller 110 can be electrically coupled at least to the feed assembly 22 and to drive assembly 38 coupled to the cutter 30. The controller 110 can be a computer processor of the cutting device 10 or a processor of a separate electronic device in wired or wireless communication with the cutting device 10. For example, as shown in FIG. 5, the controller 110 can be associated with a portable or stationary computer device 112, such as a computer tablet, terminal, laptop, desktop, or similar computer device as is known in the art.

The controller 110 can also be coupled to one or more input components 114 for receiving user selections and operating instructions. For example, the input component 114 can comprise buttons and/or a touch screen display of the cutting device 10. In other examples, the input component 114 could be a keyboard, mouse, touch screen display, or similar data entry accessory of the portable or stationary computer device 112. In other examples, the input component 114 can be a wired or wireless communications interface 116 configured to receive instructions from remote electronic devices and networks. For example, users may enter instructions using a remote computer device. The entered instructions can be transmitted to and received by the controller 110 over the communications interface 116.

In some examples, the at least one controller 110 receives operating instructions from users via the input components 114. The operating instructions can comprise manually entered operating parameters for the cutting device 10. For example, the user may manually enter the feed rate or vibrational or rotational frequency using the input component 114 of the computer device 12. In that case, the controller 110 can be configured to send instructions to the cutting device 10 causing the cutting device 10 to operate according to the manually entered parameters.

In other examples, as described in connection with step 310 in FIG. 3, the user enters information about the particles or powder to be produced. For example, the user can enter a target particle size or distribution of target particle sizes. The controller 110 can be configured to determine operating parameters for the cutting device 10 based on inputs received from users. For example, operating parameters can be determined or calculated from values in a lookup table or calibration curve and based on target particle size or distribution and on characteristics of the elongated members 12. Once the new operating parameters are known or determined, the controller 110 can be configured to set or adjust operating parameters of the cutting device 10, so that the cutting device 10 operates according to the new operating parameters.

In some examples, the system 100 further comprises sensors 118, 120 electrically coupled to the controller 110. For example, the system 100 can include sensors 118 positioned near to or in the collection vessel or hopper 46. The sensors 118 can be configured to detect information representative of characteristics of the produced particles. For example, the sensors 118 could be positioned near an opening of the collection vessel or hopper 46 so that particles falling into the collection vessel 44 pass within a field of view of the sensors 118. The sensors 118 can be configured to detect information about the particles passing through the field of view. For example, such sensors 118 can be configured to measure characteristics of the particles including average particle volume, median particle volume, particle volume distribution, or average sphericity of the particles. The system 100 can also include sensors 120 positioned in or associated with the hopper 46 for measuring qualities of the produced powder. For example, the sensors 120 can comprise a scale for measuring a total mass of the produced powder. The sensor 120 could also be configured to measure a total volume of the produced powder.

In some examples, the controller 110 can be configured to receive information detected by the sensors 118, 120 and to adjust the operating parameters for the cutting device 10 based on the received information. In this way, information for the sensors 118, 120 can be used as a feedback loop for optimizing or adjusting operation of the cutting device 10. For example, information about characteristics of the particles being produced from the sensors 118, 120 can be used to characterize particles being produced by the cutting device 10. If, based on the detected information, the controller 110 determines that the average particle volume or size is different from an anticipated or target particle volume or size, the controller 110 can be configured to adjust the operating parameters of the cutting device 10 to account for such differences. For example, if the particles being produced are determined to be larger than a target particle size, the vibrational or rotational frequency of the cutter 30 could be increased to reduce an amount of time that the apertures or holes of the cutter 30 are in contact with the elongated members 12. Similarly, a payout rate or feed rate for the elongated members could be increased so that the elongated members 12 pass through eh cutter more quickly. Increasing rotation rate and/or federate are both expected to produce smaller particles.

User Interfaces for Powder Producing Systems

In some examples, the system 100 further comprises a user interface module 124 in wired or wireless communication with the controller 110. Generally, the user interface module 124 receives user inputs, such as inputs about target particle size and other particle characteristics. The controller 110 processes the inputs and, as described previously, can control operation of the cutting device 10 based, at least in part, on the received user inputs. The controller 110 can also provide notifications and feedback about the particles being formed and/or manufacturing process to the user interface module 124. For example, the controller 110 can emit notifications when different aspects of the manufacturing process have been completed. The controller 110 can also monitor progress of the powder forming process and provide, for example, estimates for time remaining. Such information and notifications can be provided to the user interface module 124. The user interface module 124 can cause a feedback device, such as a visual display 126, to provide the information to users.

The user interface 124 can include a number of application screens or pages for receiving inputs from and providing feedback to users. Examples of such screens are shown in FIGS. 6A-6C.

FIG. 6A shows an example of an initial input screen 610 for the cutting device 10. The initial input screen 610 can comprise a number of data entry fields allowing the user to enter information about a powder being produced. For example, the screen 610 can comprise one or more fields 612 for the user to enter a target particle size. The screen 610 can also include fields 614 for a user to specify what percentage of the particles should be a particular size. For example, as shown in FIG. 6A, a user can specify that 50% of particles should be about 25 µm and 50% of particles should be about 50 µm in diameter. The user can also enter inputs for the powder to be produced. For example, the screen 610 can include a field 616 for the user to enter a total mass of powder required. In some examples, the screen 610 can also include a section 618 for entering information about the elongated members 12 (e.g., material composition and/or diameter), which can be used for determining operating parameters for the cutting device 10. In other examples, as discussed previously, information about the elongated members 12 can be determined automatically by sensors associated with the cutting device 10. In some examples, the section 618 can also include, for example, drop down lists or menus allowing the user to identify the source material (e.g., from a list including Aluminum, Stainless steel, Nickel alloy, and Titanium).

FIG. 6B shows a screen 630 that can be provided to the user while the cutting device 10 is in use. For example, the screen 630 can be shown to a user to inform the user how the cutting device 10 is progressing in performing a power producing program using the user inputs provide in the screen 610. The in-use screen 630 can comprise a section 632 with cumulative information about the powder being produced. For example, the section 632 can include real time data for characteristics of the produced particles including average particle diameter, average particle volume, average sphericity, and similar information. The screen 630 can also include a section 634 with information about progress towards completing the program. For example, the section 634 could include information about a total mass or volume of powder produced so far. The section 634 could also include, for example, a count-down timer 636 showing an estimated time until the required total volume or mass of powder has been produced.

Figure 6C:
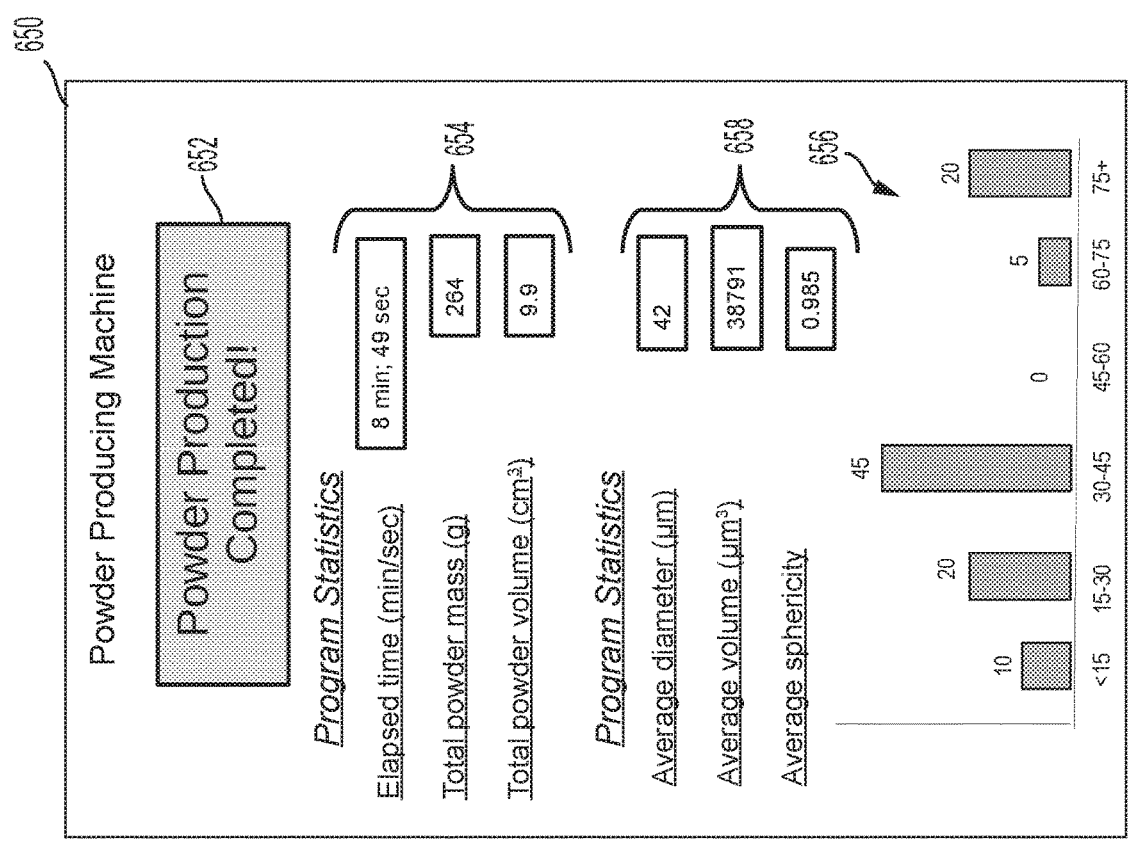

FIG. 6C shows a program complete screen 650, which can be displayed to a user after the cutting device 10 has completed preparing the powder according to the initial user inputs. The screen 650 can include, for example, a text notification 652 informing the user that the program has been completed. The screen 650 can further comprise a section 654 with statistics for the completed program including, for example, a total time required, total mass of powder produced, or total volume of powder produced. The screen 650 can further comprise, for example, a graph 656 showing, for example, the powder size distribution (PSD) for the produced powder. The screen 650 can also include a section 658 with information about the particles of the powder including, for example, average particle diameter, average particle volume, or average sphericity. The information about characteristics of the particles can be collected by sensors associated with the collection vessel or hopper 46, as described previously.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that, to the extent possible, one or more features of any embodiment can be combined with one or more features of any other embodiment.

The invention claimed is:

1. A powder production method comprising:
providing a plurality of elongated members comprising a ductile metal material;
providing a rotating or vibrating disk configured to repeatedly cut ends of the plurality of elongated members to produce particles, wherein the disk comprises a proximal surface, a distal surface, and a plurality of holes, each of which is configured to receive one of the plurality of elongated members, and wherein longitudinal axes of the plurality of elongated members are transverse to the proximal surface or the distal surface of the rotating or vibrating disk; and
advancing the ends of the plurality of elongated members or the disk towards the other of the ends of the plurality of elongated members or the disk, such that the ends of the plurality of elongated members are inserted through the plurality of holes of the disk in order to cut the particles from the ends of the plurality of elongated members to produce a powder comprising a plurality of the particles having a diameter or maximum dimension ranging from about 10 µm to about 200 µm.

2. The method of claim 1, wherein the plurality of elongated members comprise a drawn metal wire having a circular cross section.

3. The method of claim 1, wherein the plurality of elongated members comprise one or more of steel, nickel, aluminum, titanium, platinum, rhenium, niobium, or alloys thereof.

4. The method of claim 1, wherein the plurality of elongated members have a diameter or maximum dimension ranging from 10 µm to 200 µm.

5. The method of claim 1, wherein at least 95% of the particles of the plurality of particles have a diameter ranging from 15 µm to 100 µm.

6. The method of claim 1, wherein at least 99% of the particles of the plurality of particles have a diameter ranging from 15 µm to 100 µm.

7. The method of claim 1, wherein cutting the particles from the plurality of elongated members to produce the powder does not introduce porosity to the particles, such that a porosity of the particles is substantially the same as a porosity of the elongated member.

8. The method of claim 1, further comprising, after the powder is produced, spheroidizing the plurality of particles by applying at least one of heat, a chemical agent, and abrasive forces to the particles.

9. The method of claim 1, further comprising forming the produced powder into a manufactured part using a three-dimensional (3D) printing or rapid prototyping machine.

10. The method of claim 1, wherein the plurality of elongated members comprise 7000 series aluminum alloy.

11. The method of claim 1, further comprising collecting the particles of the produced powder in a collection vessel using a vacuum configured to draw the particles into the collection vessel.

12. The method of claim 1, wherein the plurality of particles are produced at a rate of at least 160,000 particles per second.

13. The method of claim 1, providing from 4 to 6 elongated members, and wherein the rotating or vibrating disk comprises from 8 to 12 holes configured to simultaneously cut ends from the 8 to 12 elongated members.

14. The method of claim 1, wherein at least 95% of the particles of the plurality of particles have a diameter within 10% of a target size.

15. The method of claim 14, wherein the target size comprises a diameter of from 10 µm to 200 µm.

16. The method of claim 1, wherein cutting the plurality of elongated members comprises advancing the plurality of elongated members towards the disk at a predetermined at least one feed rate, and moving the disk to cut the plurality of particles from the plurality of elongated members at a predetermined at least one vibrational or rotational frequency.

17. The method of claim 16, further comprising:
adjusting the at least one predetermined feed rate based, at least in part, on measurements from one or more sensors that measure characteristics of the produced powder,
wherein the one or more sensors are configured to detect at least one of the following characteristics of the produced powder: average particle volume, median particle volume, particle volume distribution, total powder weight, total powder volume, or average sphericity.

18. The method of claim 17, further comprising:
as the powder is being produced, receiving information about particles of the produced powder from the one or more sensors;

determining the average particle volume for the produced particles based on the received information from the one or more sensors; and comparing the determined average particle volume of the particles to an anticipated or target particle volume, wherein adjusting the at least one predetermined feed rate comprises increasing or decreasing the feed rate based on the comparison between the determined average particle volume and the anticipated or target particle volume to cause the particle volume of the produced powder to become closer to the anticipated or target particle volume.

19. The method of claim 1, wherein the disk oscillates back and forth to produce the particles from the plurality of elongated members at a vibration frequency selected to produce the particles with the diameter or maximum dimension ranging from about 10 μm to about 200 μm.

20. The method of claim 19, wherein the vibration frequency is an ultrasonic vibration frequency.

21. The method of claim 20, wherein the disk is driven at the vibration frequency by a tuned sonotrode driven to resonance.

22. The method of claim 1, wherein advancing the plurality of elongated members towards the disk comprises advancing the plurality of elongated members at a first feed rate for a first predetermined time period followed by advancing the plurality of elongated members at a second feed rate for a second predetermined time period.

23. The method of claim 22, wherein during the first predetermined time period, a first plurality of the particles is produced, wherein at least 95% of the particles of the first plurality of particles have a diameter within 10% of a first target size.

24. The method of claim 23, wherein during the second predetermined time period, a second plurality of the particles is produced, wherein at least 95% of the particles of the second plurality of particles have a diameter within 10% of a second target size, which is different that the first target size.

25. The method of claim 24, further comprising selecting a target particle size distribution for the first target size and the second target size and, prior to advancing the plurality of elongated members towards the disk, determining the first time period and the second time period based on the selected particle size distribution.

\* \* \* \* \*

UNITED STATES PATENT AND TRADEMARK OFFICE
CERTIFICATE OF CORRECTION

PATENT NO. : 11,648,610 B2
APPLICATION NO. : 17/044886
DATED : May 16, 2023
INVENTOR(S) : John E. Barnes et al.

Page 1 of 1

It is certified that error appears in the above-identified patent and that said Letters Patent is hereby corrected as shown below:

In the Claims

Column 18, Line 37, Claim 13, delete "4 to 6" and insert -- 8 to 12 --

Signed and Sealed this
Fourth Day of July, 2023

Katherine Kelly Vidal
*Director of the United States Patent and Trademark Office*